US011315409B2

(12) United States Patent
Riggert et al.

(10) Patent No.: US 11,315,409 B2
(45) Date of Patent: Apr. 26, 2022

(54) DECREASING FALSE ALARMS IN RFID EXIT PORTALS

(71) Applicant: Sensormatic Electronics, LLC, Boca Raton, FL (US)

(72) Inventors: Eric Floyd Riggert, Trabuco Canyon, CA (US); Michael Sansur, Modjeska, CA (US); Adam S. Bergman, Boca Raton, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 49 days.

(21) Appl. No.: 17/024,411

(22) Filed: Sep. 17, 2020

(65) Prior Publication Data

US 2021/0082277 A1  Mar. 18, 2021

Related U.S. Application Data

(60) Provisional application No. 62/902,252, filed on Sep. 18, 2019.

(51) Int. Cl.
 *G08B 29/18* (2006.01)
 *G08B 13/24* (2006.01)
 *G06K 7/10* (2006.01)

(52) U.S. Cl.
 CPC ....... *G08B 29/185* (2013.01); *G06K 7/10475* (2013.01); *G08B 13/246* (2013.01)

(58) Field of Classification Search
 None
 See application file for complete search history.

(56) References Cited

U.S. PATENT DOCUMENTS

| 8,587,432 | B2 | 11/2013 | Mulla | |
|---|---|---|---|---|
| 11,183,038 | B2* | 11/2021 | Miller | G06K 7/10297 |
| 2010/0117821 | A1* | 5/2010 | Cruz | G08B 21/0275 |
| | | | | 340/539.1 |

(Continued)

FOREIGN PATENT DOCUMENTS

| CN | 201464656 U | * 5/2010 | |
|---|---|---|---|
| WO | WO-2007114819 A1 | * 10/2007 | G08B 13/2408 |

(Continued)

OTHER PUBLICATIONS

International Search Report and Written Opinion for PCT/US2020/051436 dated Dec. 14, 2020.

*Primary Examiner* — Fekadeselassie Girma
(74) *Attorney, Agent, or Firm* — ArentFox Schiff LLP

(57) ABSTRACT

Transmitting a radio frequency identification (RFID) interrogation signal into an RFID interrogation zone of an Electronic Article Surveillance (EAS) system. Detecting at least one response signal from a first RFID tag of the EAS system responding to the interrogation signal. Capturing, at one or more times in a window of time around the detection, sensor data within a sensor field, the sensor field and the RFID interrogation zone overlapping to form a zone of interest. Characterizing movement of a non-tag object during the window of time based on the captured sensor data. Determining whether the first RFID tag is associated with the characterized non-tag object based on a comparison of the at least one response signal and the characterized movement of the non-tag object.

20 Claims, 11 Drawing Sheets

(56) References Cited

U.S. PATENT DOCUMENTS

| | | | |
|---|---|---|---|
| 2012/0044074 A1* | 2/2012 | Mulla | G08B 13/2417 340/572.1 |
| 2012/0307051 A1 | 12/2012 | Welter | |
| 2015/0048947 A1* | 2/2015 | Yang | G08B 13/248 340/572.8 |
| 2015/0244992 A1 | 8/2015 | Buehler | |
| 2018/0040219 A1* | 2/2018 | Clark | G08B 13/246 |
| 2021/0065525 A1* | 3/2021 | Soto | G08B 13/2417 |

FOREIGN PATENT DOCUMENTS

| | | | | |
|---|---|---|---|---|
| WO | WO-2010148038 A1 * | 12/2010 | | G08B 13/248 |
| WO | WO-2012162799 A1 * | 12/2012 | | G08B 13/1654 |

* cited by examiner

DECREASING FALSE ALARMS IN RFID EXIT PORTALS

CROSS-REFERENCE TO RELATED APPLICATIONS

This application claims the benefit of U.S. Provisional Application No. 62/902,252, entitled "System and Method for Decreasing False Alarms in RFID Exit Portals," filed Sep. 18, 2019, which is expressly incorporated by reference herein in its entirety.

BACKGROUND

Technical Field

The present disclosure relates generally to Electronic Article Surveillance (EAS). Examples related to EAS using a Radio Frequency Identification (RFID) tag with tag location verified by a secondary sensor, in part to decrease the rate of false alarms at the portal.

INTRODUCTION

EAS systems are commonly used in retail stores and other settings to prevent the unauthorized removal of goods from a protected area. Typically, a detection system is configured at an exit from the protected area, which comprises one or more transmitters and antennas ("pedestals") capable of generating an electromagnetic field across the exit, known as the "interrogation zone." Articles to be protected are tagged with an EAS marker (such as an RFID tag) that, when active, generates a response signal when passed through this interrogation zone. An antenna and receiver in the same or another "pedestal" detects this response signal and generates an alarm.

A personal area network (PAN) is a computer network for interconnecting electronic devices centered on an individual person's workspace. A PAN provides data transmission among devices such as computers, smartphones, tablets, and personal digital assistants. PANs can be used for communication among the personal devices themselves, or for connecting to a higher level network and the Internet where one master device takes up the role as gateway. A PAN may be wireless or carried over wired interfaces such as USB. A wireless personal area network (WPAN) is a PAN carried over a low-powered, short-distance wireless network technology such as IrDA, Wireless USB, Bluetooth including (Bluetooth Low Energy (LE)), or ZigBee. The reach of a WPAN varies from a few centimeters to a few meters.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Examples of the technology disclosed herein include methods, systems, and apparatuses of electronic article surveillance (EAS). In some examples, an EAS system transmits a radio frequency identification (RFID) interrogation signal into an RFID interrogation zone of an EAS system. The EAS system then detects at least one response signal from a first RFID tag of the EAS system responding to the interrogation signal. The system further captures, at one or more times in a window of time around the detection, sensor data within a sensor field, the sensor field and the RFID interrogation zone overlapping to form a zone of interest, and then characterizing movement of a non-tag object during the window of time based on the captured sensor data. The EAS system determines whether the first RFID tag is associated with the characterized non-tag object based on a comparison of the at least one response signal and the characterized movement of the non-tag object.

In some examples, the capturing is in response to the detecting. In some such examples, detecting further includes detecting that the tag is not authorized to be in the RFID interrogation zone. In some such examples, the EAS then alarms in response to determining that the first RFID tag is associated with the characterized non-tag object based on a comparison of the detected plurality of response signals and the characterized movement of the non-tag object.

In some examples, characterizing comprises estimating one or more of a speed of the non-tag object and a direction of travel of the non-tag object. In some examples determining whether the first RFID tag is associated with the characterized non-tag object comprises determining a similarity greater than a threshold similarity between the detected plurality of response signals and the characterized movement of the non-tag object. In some examples, the zone of interest is an RFID portal zone of the EAS system.

In some examples, the interrogation zone is at an exterior boundary of a controlled area. In such examples, capturing sensor data includes capturing first sensor data. In such examples, determining includes determining a direction of travel of the non-tag object based on the captured first sensor data. For a determined direction of travel of the non-tag object toward the interrogation zone, the EAS system estimates an arrival time of the non-tag object in the zone of interest. In such examples, capturing sensor data further includes capturing second sensor data in the zone of interest during a predetermined threshold window of time around the estimated arrival time. In such examples, determining includes determining whether a non-tag object arrives in the zone of interest during the predetermined threshold window of time. In such examples, for a determination that a non-tag object did not arrive in the zone of interest during the predetermined threshold window of time, the EAS system does not alarming on the first RFID tag; and for a determination that a non-tag object arrived in the zone of interest during the predetermined threshold window of time, the EAS system alarms on the first RFID tag.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents

DETAILED DESCRIPTION

Figure 1:
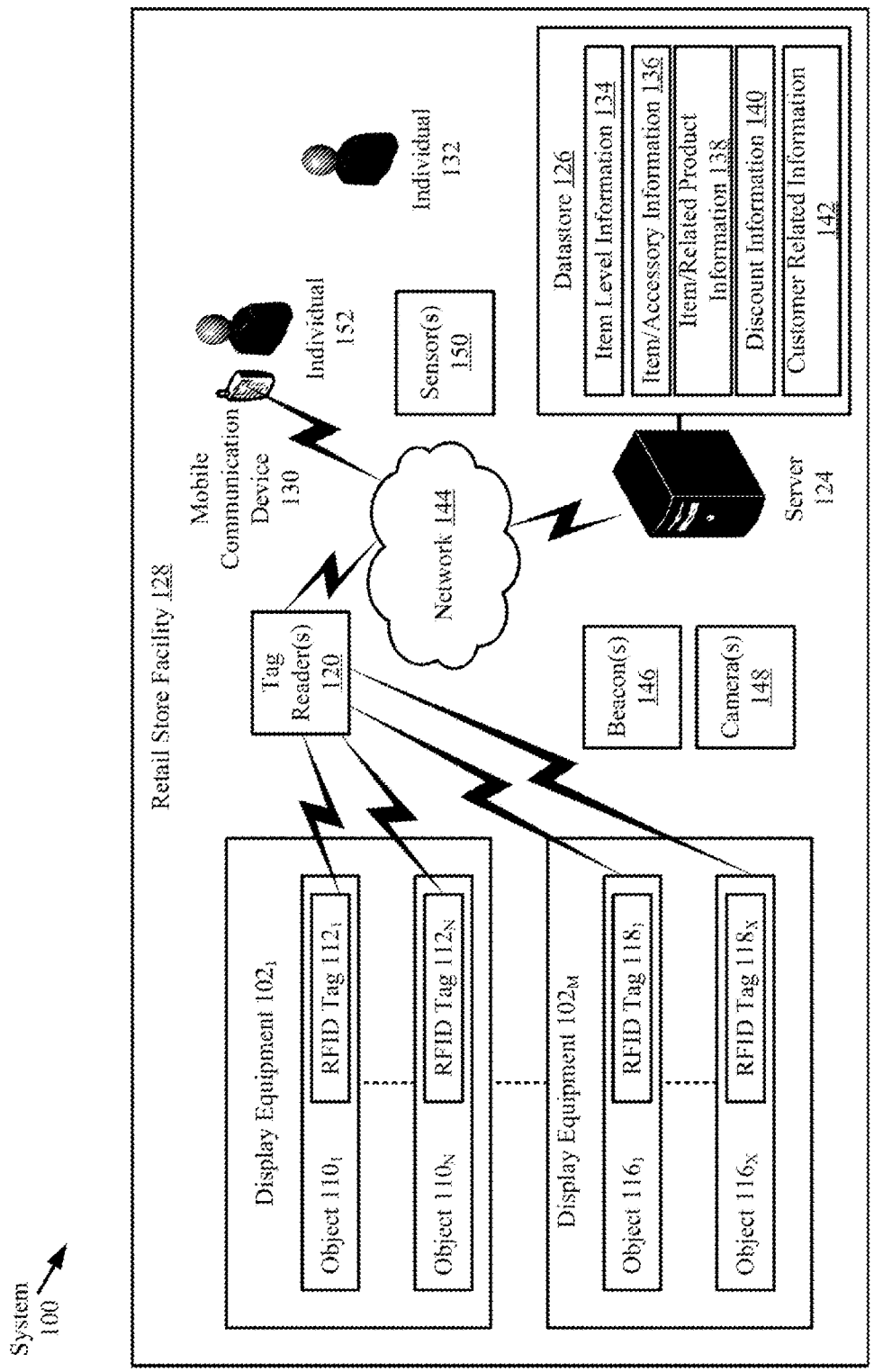
FIG. 1 is an illustration of an illustrative architecture for a system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes that come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages, and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

As used in this document, the singular form "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

In the retail industry, it is common to "source tag" merchandise with RFID tags, either at the time of packaging/manufacture, or at some other point in the in the supply chain. At the same time, electronic article surveillance (EAS) technology and devices have proven critical to the reduction of theft and so called "shrinkage." Since many items arrive at the retailer with RFID tags, it is desirable that RFID tag be used also to provide EAS functionality in addition to their intended function of providing capabilities such as inventory control, shelf reading, non-line of sight reading, etc.

Currently, using RFID as an EAS exit solution is limited by stray or reflected alarms when transmission powers are increased. People walking through the EAS portal may trigger alarms even if they are not removing merchandise from the premises without authorization. Alarms can be caused by stationary RFID tags located some distance from the exit. Further, such an approach limits the ability for the retailer to place merchandise too close to the exit system due to false alarms. The large read ranges of the RFID technology coupled with RF reflections makes it very difficult to control the RFID system's detection area at the exit.

In real-world environments, with changing RF reflections may be subject to constant change to store fixtures, furniture, support columns, doors, customers in motion, shopping carts etc. These types of systems sometimes has a hard time properly discriminating between actual tags which are read outside (or detected going outside), and tags on items properly inside the store which are falsely read outside due to RF reflections, multipath/backscattering, or missed inventory attempts due to temporary interferers.

As RFID transmission levels are increased in a RFID as EAS system, the number of false alarms caused by stray or reflected may also increase, which compromises the accuracy and effectiveness of the system. With increase transmission power levels, people walking through the EAS portal may appear to be triggering alarms, even if they are not trying to remove merchandise from the premises without authorization. These false alarms can be triggered by stationary RFID tags located some distance from the exit, not the person exiting the store.

Examples of the technology disclosed herein can decrease false alarms in RFID exit portal systems by integrating one or more additional sensors to collect environmental data in order to validate that an alarm event is occurring. The one or more sensors can be sense the presence and/or movement of humans and other objects. The additional sensors can also be tag detectors/readers to sense the presence/movement of tags, which are supplemental to the RFID exit readers. The one or more additional sensors can mounted on the exit pedestals, overhead, or any suitable location either within the exit portal or outside (usually nearby) the exit portal. Additional sensors installed outside the exit portal can be located within the protected area (e.g. inside the store) or outside of the protected area, including areas beyond the point of exit (e.g. a doorway).

These and other features of the present disclosure are discussed in detail below with regard to FIGS. 1-11.

Referring now to FIG. 1, there is provided a schematic illustration of an illustrative system 100 that is useful for understanding the present solution. The present solution is described herein in relation to a retail store environment. The present solution is not limited in this regard, and can be used in other environments. For example, the present solution can be used in distribution centers, factories and other commercial environments. Notably, the present solution can be employed in any environment in which objects and/or items need to be located and/or tracked.

The system 100 is generally configured to allow (a) improved inventory counts and surveillance of objects and/or items located within a facility, and (b) improved customer experiences. As shown in FIG. 1, system 100 comprises a Retail Store Facility ("RSF") 128 in which display equipment $102_1$-$102_M$ is disposed. The display equipment is provided for displaying objects (or items) $110_1$-$110_N$, $116_1$-$116_X$ to customers of the retail store. The display equipment can include, but is not limited to, shelves, article display cabinets, promotional displays, fixtures, and/or equipment se-curing areas of the RSF 128. The RSF can also include emergency equipment (not shown), checkout counters. Emergency equipment, checkout counters, video cameras, people counters, and conventional EAS systems are well known in the art, and therefore will not be described herein.

At least one tag reader 120 is provided to assist in counting and tracking locations the objects $110_1$-$110_N$, $116_1$-$116_X$ within the RSF 128. The tag reader 120 comprises an RFID reader configured to read RFID tags. RFID readers are well known in the art, and therefore will be described at a sufficient level of detail below for understanding of the claimed invention.

RFID tags $112_1$-$112_N$, $118_1$-$118_X$ are respectively attached or coupled to the objects $110_1$-$110_N$, $116_1$-$116_X$. This coupling is achieved via an adhesive (e.g., glue, tape, or sticker), a mechanical coupler (e.g., straps, clamps, snaps, etc.), a weld, chemical bond, or other means. The RFID tags can alternatively or additionally comprise dual-technology tags that have both EAS and RFID capabilities as described herein.

Notably, the tag reader 120 is strategically placed at a known location within the RSF 128, for example, at an exit/entrance. By correlating the tag reader's RFID tag reads and the tag reader's known location within the RSF 128, it is possible to determine the general location of objects $110_1$-$110_N$, $116_1$-$116_X$ within the RSF 128. The tag reader's known coverage area also facilitates object location determinations. Accordingly, RFID tag read information and tag reader location information is stored in a datastore 126. This information can be stored in the datastore 126 using a server 124 and network 144 (e.g., an Intranet and/or Internet).

System 100 also comprises a Mobile Communication Device ("MCD") 130. MCD 130 includes, but is not limited to, a cell phone, a smart phone, a table computer, a personal digital assistant, and/or a wearable device (e.g., a smart watch). Each of the listed devices is well known in the art, and therefore will not be described herein. In accordance with some examples, the MCD 130 has a software application installed thereon that is operative to: facilitate the provision of various information 134-142 to the individual 152; facilitate a purchase transaction; and/or facilitate the detachment of the RFID tags $112_1$-$112_N$, $118_1$-$118_X$ from the objects $110_1$-$110_N$, $116_1$-$116_X$; and/or facilitate the detachment of an anchored chain or cable from the objects $110_1$-$110_N$, $116_1$-$116_X$.

The MCD 130 is generally configured to provide a visual and/or auditory output of item level information 134, accessory information 136, related product information 138, discount information 140, and/or customer related information 142. The item level information includes, but is not limited to, an item description, item nutritional information, a promotional message, an item regular price, an item sale price, a currency symbol, and/or a source of the item.

An accessory includes, but is not limited to, a useful auxiliary item that can be attached to or removed from an item (e.g., a drill bit or battery of a drill). The accessory information includes, but is not limited to, an accessory description, accessory nutritional information, a promotional message, an accessory regular price, an accessory sale price, a currency symbol, a source of the accessory, and/or an accessory location in the facility.

A related product includes, but is not limited to, a product that can be used in conjunction with or as an alternative to another product (e.g., diaper rash cream which can be used when changing a diaper, or a first diaper can be used as an alternative to another diaper). The related product information includes, but is not limited to, a related product description, related product nutritional information, a promotional message, a related product regular price, a related product sale price, a currency symbol, a source of the related product, and/or a related product location in the facility.

The discount information can include, but is not limited to, a discount price for a product based on a loyalty level or other criteria. The customer related information includes, but is not limited to, customer account numbers, customer identifiers, usernames, passwords, payment information, loyalty levels, historical purchase information, and/or activity trends.

The item level information, accessory information, related product information and/or discount in-formation can be output in a format selected from a plurality of formats based on a geographic location of the item, a location of the MCD, a date, and/or an item pricing status (i.e., whether the item is on sale). In a display context, the format is defined by a font parameter, a color parameter, a brightness parameter, and/or a display blinking parameter. In an auditory context, the format is defined by a volume parameter, a voice tone parameter, and/or a male/female voice selected parameter.

The MCD 130 can also be configured to read barcodes and/or RFID tags. Information obtained from the barcode and/or RFID tag reads may be communicated from the MCD 130 to the server 124 via network 144. Similarly, the stored information 134-142 is provided from the server 124 to the MCD 130 via network 144. The network 144 includes an Intranet and/or the Internet.

Server 124 can be local to the facility 128 as shown in FIG. 1 or remote from the facility 128. Server 124 will be described in more detail below in relation to FIG. 4. Still, it should be understood that server 124 is configured to: write data to and read data from datastore 126, RFID tags $112_1$-$112_N$, $118_1$-$118_X$, and/or MCD 130; perform language and currency conversion operations using item level information and/or accessory information obtained from the datastore, RFID tags, and/or MCD; perform data analytics based on inventory information, tag read information, MCD tacking information, and/or information 134-142; perform image processing using images captured by camera(s) 148; and/or determine locations of RFID tags and/or MCDs in the RSF 128 using beacon(s) 146, tag reader 120 or other devices having known locations and/or antenna patterns.

In some examples, one or more beacons 146 transmitting an RF signal (second RF signal that is non-RFID) other than the RFID interrogation signal are placed to cover a zone of interest also covered by a tag reader 120 placed to cover an RFID interrogation zone, e.g., at a portal of the retail facility 128. The system 100 can detect and derive any number of relevant indicators based on second RF signal. The tag 112/118 response to the second RF signal is analyzed and compared to data collected by the RFID signal response that occurred concurrently with the tag's passage through the portal.

The server 124 facilitates updates to the information 134-142 output from the MCD 130. Such information updating can be performed periodically, in response to instructions received from an associate (e.g., a retail store employee 132), in response to a detected change in the item level, accessory and/or related product information, in response to a detection that an individual is in proximity to an RFID tag, and/or in response to any motion or movement of the RFID tag. For example, if a certain product is placed on sale, then the sale price for that product is transmitted to MCD 130 via network 144 and/or RFID tag. The sale price is then output from the MCD 130. The present solution is not limited to the particulars of this example.

Although a single MCD 130 and/or a single server 124 is(are) shown in FIG. 1, the present solution is not limited in this regard. It is contemplated that more than one computing device can be implemented. In addition, the present solution is not limited to the illustrative system architecture described in relation to FIG. 1.

During operation of system 100, the content displayed on the display screen of the MCD 130 is dynamically controlled based upon various tag or item related information and/or customer related information (e.g., mobile device identifier, mobile device location in RSF 128, and/or customer loyalty level). Tag or item level information includes, but is not limited to, first information indicating that an RFID tag is in motion or that an object is being handled by an individual 152, second information indicating a current location of the RFID tag and/or the MCD 130, third information indicating an accessory or related product of the object to which the moving RFID tag is coupled, and/or fourth information indicating the relative locations of the accessory and the moving RFID tag and/or the relative locations of the related product and the moving RFID tag. The first, second and fourth information can be derived based on sensor data generated by sensors local to the RFID tag. Accordingly, the RFID tags $112_1$-$112_N$, $118_1$-$118_X$ include one or more sensors to detect their current locations, detect any individual in proximity thereto, and/or detect any motion or movement thereof. The sensors include, but are not limited to, an Inertial Measurement Unit ("IMU"), a vibration sensor, a light sensor, an accelerometer, a gyroscope, a proximity sensor, a microphone, and/or a beacon communication device. The third information can be stored local to the RFID tag(s) or in a remote datastore 126 as information 136, 138.

In some scenarios, the MCD 130 facilitates the server's 124 (a) detection of when the individual 152 enters the RSF 128, (b) tracking of the individual's movement through the RSF, (c) detection of when the individual is in proximity to an object to which an RFID tag is coupled, (d) determination that an RFID tag is being handled or moved by the individual based on a time stamped pattern of MCD movement and a timestamped pattern of RFID tag movement, and/or (e) determination of an association of moving RFID tags and the individual.

When a detection is made that an RFID tag is being moved, the server 124 can, in some scenarios, obtain customer related information (such as a loyalty level) 142 associated with the individual 152. This information can be obtained from the individual's MCD 130 and/or the datastore 126. The customer related information 142 is then used to retrieve discount information 140 for the object to which the RFID tag is coupled. The retrieved discount information is then communicated from the server 124 to the individual's MCD 130. The individual's MCD 130 can output the discount information in a visual format and/or an auditory format. Other information may also be communicated from the server 124 to the individual's MCD 130. The other information includes, but is not limited to, item level information, accessory information, and/or related product information.

In those or other scenarios, a sensor embedded in the RFID tag detects when an individual is handling the object to which the RFID tag is coupled. When such a detection is made, the RFID tag retrieves the object's unique identifier from its local memory, and wirelessly communicates the same to the tag reader 120. The tag reader 120 then passes the information to the server 124. The server 124 uses the object's unique identifier and the item/accessory relationship in-formation (e.g., table) 136 to determine if there are any accessories associated therewith. If no accessories exist for the object, the server 124 uses the item level information 134 to determine one or more characteristics of the object. For example, the object includes a product of a specific brand. The server 124 then uses the item/related product information (e.g., table) 138 to identify: other products of the same type with the same characteristics; and/or other products that are typically used in conjunction with the object. Related product information for the identified related products is then retrieved and provided to the MCD 130. The MCD 130 can output the related product information in a visual format and/or an auditory format. The individual 152 can perform user-software interactions with the MCD 130 to obtain further information obtain the related product of interest. The present solution is not limited to the particulars of this scenario.

Figure 2:
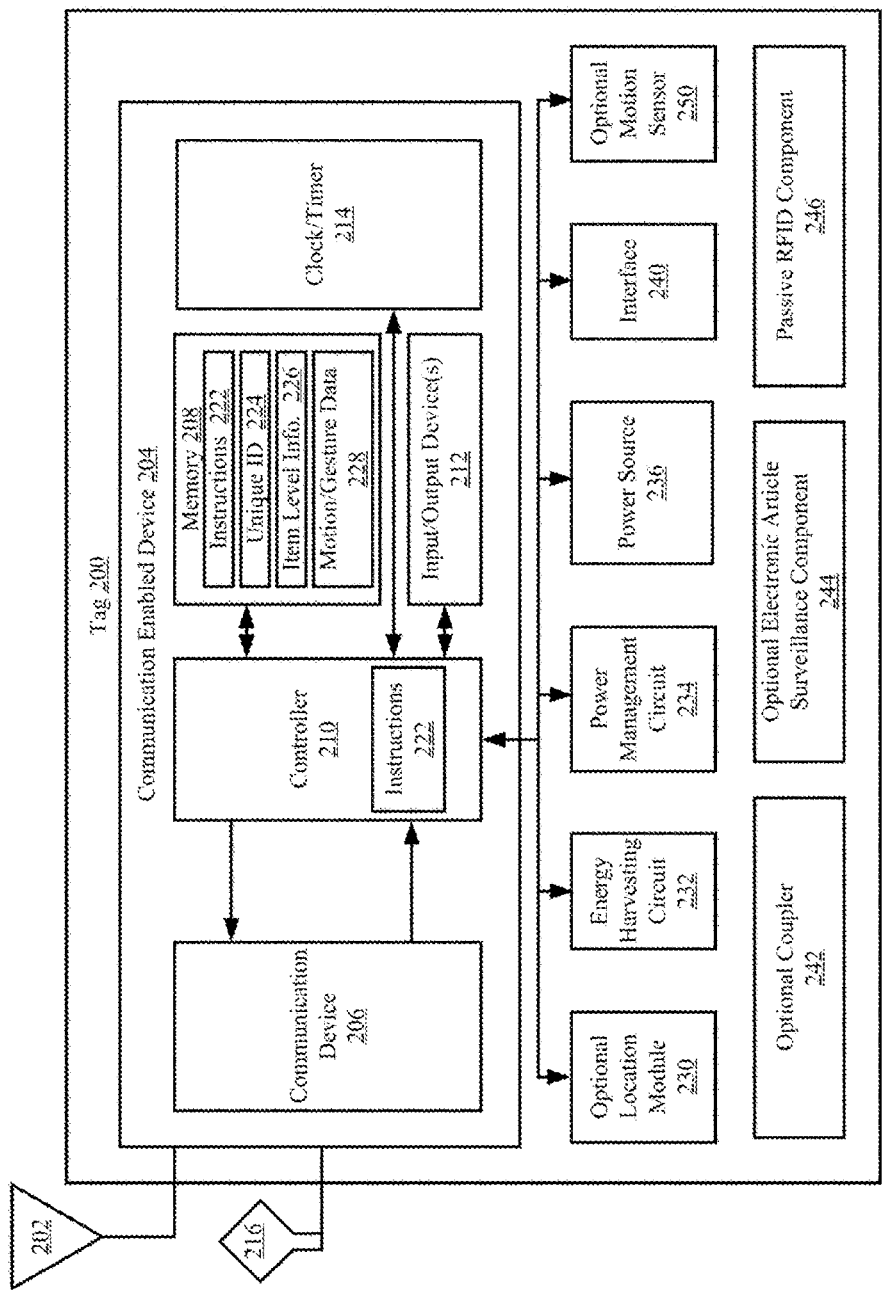
FIG. 2 is an illustration of an illustrative architecture for a tag.

Referring now to FIG. 2, there is an illustration of an illustrative architecture for a tag 200. RFID tags $112_1$-$112_N$, $118_1$-$118_X$ are the same as or similar to tag 200. As such, the discussion of tag 200 is sufficient for understanding the RFID tags $112_1$-$112_N$, $118_1$-$118_X$ of FIG. 1. Tag 200 is generally configured to perform operations to (a) minimize power usage so as to extend a power source's life (e.g., a battery or a capacitor), (b) minimize collisions with other tags so that the tag of interest can be seen at given times, (c) optimize useful information within an inventory system (e.g., communicate useful change information to a tag reader), and/or (d) optimize local feature functions.

The tag 200 can include more or less components than that shown in FIG. 2. However, the components shown are sufficient to disclose an illustrative embodiment implementing the present solution. Some or all of the components of the tag 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative tag 200 configured to facilitate improved inventory management/surveillance and customer experience. In this regard, the tag 200 is configured for allowing data to be exchanged with an external device (e.g., tag reader 120 of FIG. 1, a beacon 146 of FIG. 1, a Mobile Communication Device ("MCD") 130 of FIG. 1, and/or server 124 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies (is)are employed: Radio Frequency ("RF") communication technology; Bluetooth technology (including Bluetooth Low Energy (LE)); WiFi technology; beacon technology; and/or LiFi technology. Each of the listed wireless communication technologies is well known in the art, and therefore will not be described in detail herein. Any known or to be known wireless communication technology or other wireless communication technology can be used herein without limitation.

The components 206-214 shown in FIG. 2 may be collectively referred to herein as a communication enabled device 204, and include a memory 208 and a clock/timer 214. Memory 208 may be a volatile memory and/or a non-volatile memory. For example, the memory 208 can include, but is not limited to, Random Access Memory ("RAM"), Dynamic RAM ("DRAM"), Static RAM ("SRAM"), Read Only Memory ("ROM"), and flash memory. The memory 208 may also comprise unsecure memory and/or secure memory.

In some scenarios, the communication enabled device 204 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 208. Notably, the communication protocols can be downloaded to the device at any given time. The initial/default role (being an RFID, WiFi, LiFi, etc. tag) can be assigned at the deployment thereof. If the user desires to use another protocol later, the user can remotely change the communication protocol of the deployed tag 200. The update of the firmware, in case of issues, can also be performed remotely.

As shown in FIG. 2, the communication enabled device 204 comprises at least one antenna 202, 216 for allowing data to be exchanged with the external device via a wireless communication technology (e.g., an RFID technology, an NFC technology, a SRC technology, and/or a beacon technology). The antenna 202, 216 is configured to receive signals from the external de-vice and/or transmit signals generated by the communication enabled device 204. The antenna 202, 216 can comprise a near-field or far-field antenna. The antennas include, but are not limited to, a chip antenna or a loop antenna.

The communication enabled device 204 also comprises a communication device (e.g., a transceiver or transmitter) 206. Communication devices (e.g., transceivers or transmitters) are well known in the art, and therefore will not be described herein. However, it should be understood that the communication device 206 generates and transmits signals (e.g., RF carrier signals) to external devices, as well as receives signals (e.g., RF signals) transmitted from external devices. In this way, the communication enabled device 204 facilitates the registration, identification, location and/or tracking of an item (e.g., object 110 or 112 of FIG. 1) to which the tag 200 is coupled.

The communication enabled device 204 is configured so that it: communicates (transmits and receives) in accordance with a time slot communication scheme; and selectively enables/disables/bypasses the communication device (e.g., transceiver) or at least one communications operation based on output of a motion sensor 250. In some scenarios, the communication enabled device 204 selects: one or more time slots from a plurality of time slots based on the tag's unique identifier 224 (e.g., an Electronic Product Code ("EPC")); and/or determines a Window Of Time ("WOT") during which the communication device (e.g., transceiver) 206 is to be turned on or at least one communications operation is be enabled subsequent to when motion is detected by the motion sensor 250. The WOT can be determined based on environmental conditions (e.g., humidity, temperature, time of day, relative distance to a location device (e.g., beacon or location tag), etc.) and/or system conditions (e.g., amount of traffic, interference occurrences, etc.). In this regard, the tag 200 can include additional sensors not shown in FIG. 2.

The communication enabled device 204 also facilitates the automatic and dynamic modification of item level information 226 that is being or is to be output from the tag 200 in response to certain trigger events. The trigger events can include, but are not limited to, the tag's arrival at a particular facility (e.g., RSF 128 of FIG. 1), the tag's arrival in a particular country or geographic region, a date occurrence, a time occurrence, a price change, and/or the reception of user instructions.

Item level information 226 and a unique identifier ("ID") 224 for the tag 200 can be stored in memory 208 of the communication enabled device 204 and/or communicated to other external devices (e.g., tag reader 120 of FIG. 1, beacon 146 of FIG. 1, MCD 130 of FIG. 1, and/or server 124 of FIG. 1) via communication device (e.g., transceiver) 206 and/or interface 240 (e.g., an Internet Protocol or cellular network interface). For example, the communication enabled de-vice 204 can communicate information specifying a timestamp, a unique identifier for an item, item description, item price, a currency symbol and/or location information to an external device. The external device (e.g., server or MCD) can then store the information in a database (e.g., database 126 of FIG. 1) and/or use the information for various purposes.

The communication enabled device 204 also comprises a controller 210 (e.g., a CPU) and in-put/output devices 212. The controller 210 can execute instructions 222 implementing methods for facilitating inventory counts and management. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 can also reside, completely or at least partially, with-in the controller 210 during execution thereof by the tag 200. The memory 208 and the controller 210 also can constitute machine-readable media. The term "machine-readable media," as used here, refers to a single medium or multiple media (e.g., a centralized or distributed database, and/or associated caches and servers) that store the one or more sets of instructions 222. The term "machine-readable media," as used here, also refers to any medium that is capable of storing, encoding, or carrying a set of instructions 222 for execution by the tag 200 and that cause the tag 200 to perform any one or more of the methodologies of the present disclosure.

The input/output devices can include, but are not limited to, a display (e.g., an E Ink display, an LCD display and/or an active matrix display), a speaker, a keypad, and/or light emitting diodes. The display is used to present item level information in a textual format and/or graphical format. Similarly, the speaker may be used to output item level information in an auditory format. The speaker and/or light emitting diodes may be used to output alerts for drawing a person's attention to the tag 200 (e.g., when motion thereof has been detected) and/or for notifying the person of a particular pricing status (e.g., on sale status) of the item to which the tag is coupled.

The clock/timer 214 is configured to determine a date, a time, and/or an expiration of a pre-defined period of time. Technique for determining these listed items are well known in the art, and therefore will not be described herein. Any known or to be known technique for determining these listed items can be used herein without limitation.

The tag 200 also comprises an optional location module 230. The location module 230 is generally configured to determine the geographic location of the tag at any given time. For example, in some scenarios, the location module 230 employs Global Positioning System ("GPS") technology and/or Internet based local time acquisition technology. The present solution is not limited to the particulars of this example. Any known or to be known technique for determining a geographic lo-cation can be used herein without limitation including relative positioning within a facility or structure.

The optional coupler 242 is provided to securely or removably couple the tag 200 to an item (e.g., object 110 or 112 of FIG. 1). The coupler 242 includes, but is not limited to, a mechanical coupling means (e.g., a strap, clip, clamp, snap) and/or adhesive (e.g., glue or sticker). The coupler 242 is optional since the coupling can be achieved via a weld and/or chemical bond.

The tag 200 can also include a power source 236, an optional Electronic Article Surveillance ("EAS") component 244, and/or a passive/active/semi-passive RFID component 246. Each of the listed components 236, 244, 246 is well known in the art, and therefore will not be described herein. Any known or to be known battery, EAS component and/or RFID component can be used herein without limitation. The power source 236 can include, but is not limited to, a rechargeable battery and/or a capacitor.

As shown in FIG. 2, the tag 200 further comprises an energy harvesting circuit 232 and a power management circuit 234 for ensuring continuous operation of the tag 200 without the need to change the rechargeable power source (e.g., a battery). In some scenarios, the energy harvesting circuit 232 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy. Energy harvesting circuits are well known in the art, and therefore will not be described herein. Any known or to be known energy harvesting circuit can be used herein without limitation.

As noted above, the tag 200 may also include a motion sensor 250. Motion sensors are well known in the art, and therefore will not be described herein. Any known or to be known motion sensor can be used herein without limitation. For example, the motion sensor 250 includes, but is not limited to, a vibration sensor, an accelerometer, a gyroscope, a linear motion sensor, a Passive Infrared ("PIR") sensor, a tilt sensor, and/or a rotation sensor.

The motion sensor 250 is communicatively coupled to the controller 210 such that it can notify the controller 210 when tag motion is detected. The motion sensor 250 also communicates sensor data to the controller 210. The sensor data is processed by the controller 210 to determine whether or not the motion is of a type for triggering enablement of the communication device (e.g., transceiver) 206 or at least one communications operation. For example, the sensor data can be compared to stored motion/gesture data 228 to determine if a match exists there-between. More specifically, a motion/gesture pattern specified by the sensor data can be compared to a plurality of motion/gesture patterns specified by the stored motion/gesture data 228. The plurality of motion/gesture patterns can include, but are not limited to, a motion pattern for walking, a motion pattern for running, a motion pattern for vehicle transport, a motion pattern for vibration caused by equipment or machinery in proximity to the tag (e.g., an air conditioner or fan), a gesture for requesting assistance, a gesture for obtaining additional product information, and/or a gesture for product purchase. The type of movement (e.g., vibration or being carried) is then determined based on which stored motion/gesture data matches the sensor data. This feature of the present solution allows the tag 200 to selectively enable the communication device (e.g., transceiver) or at least one communications operation only when the tag's location within a facility is actually being changed (e.g., and not when a fan is causing the tag to simply vibrate).

In some scenarios, the tag 200 can be also configured to enter a sleep state in which at least the motion sensor triggering of communication operations is disabled. This is desirable, for example, in scenarios when the tag 200 is being shipped or transported from a distributor to a customer. In those or other scenarios, the tag 200 can be further configured to enter the sleep state in response to its continuous detection of motion for a given period of time. The tag can be transitioned from its sleep state in response to expiration of a defined time period, the tag's reception of a control signal from an external device, and/or the tag's detection of no motion for a period of time.

The power management circuit 234 is generally configured to control the supply of power to components of the tag 200. In the event all of the storage and harvesting resources deplete to a point where the tag 200 is about to enter a shutdown/brownout state, the power management circuit 234 can cause an alert to be sent from the tag 200 to a remote device (e.g., tag reader 120 or server 124 of FIG. 1). In response to the alert, the remote device can inform an associate (e.g., a store employee 132 of FIG. 1) so that (s)he can investigate why the tag 200 is not recharging and/or holding charge.

The power management circuit 234 is also capable of redirecting an energy source to the tag's 200 electronics based on the energy source's status. For example, if harvested energy is sufficient to run the tag's 200 function, the power management circuit 234 confirms that all of the tag's 200 storage sources are fully charged such that the tag's 200 electronic components can be run directly from the harvested energy. This ensures that the tag 200 always has stored energy in case harvesting source(s) disappear or lesser energy is harvested for reasons such as drop in RF, light or vibration power levels. If a sudden drop in any of the energy sources is detected, the power management circuit 234 can cause an alert condition to be sent from the tag 200 to the remote device (e.g., tag reader 120 or server 124 of FIG. 1). At this point, an investigation may be required as to what caused this alarm. Accordingly, the remote device can inform the associate (e.g., a store employee 132 of FIG. 1) so that (s)he can investigate the issue. It may be that other merchandise are obscuring the harvesting source or the item is being stolen.

The present solution is not limited to that shown in FIG. 2. The tag 200 can have any architecture provided that it can perform the functions and operations described herein. For example, all of the components shown in FIG. 2 can comprise a single device (e.g., an Integrated Circuit ("IC")). Alternatively, some of the components can comprise a first tag element (e.g., a Commercial Off The Shelf ("COTS") tag) while the remaining components comprise a second tag element communicatively coupled to the first tag element. The second tag element can provide auxiliary functions (e.g., motion sensing, etc.) to the first tag element. The second tag element may also control operational states of the first tag element. For example, the second tag element can selectively (a) enable and disable one or more features/operations of the first tag element (e.g., transceiver operations), (b) couple or decouple an antenna to and from the first tag element, (c) by-pass at least one communications device or operation, and/or (d) cause an operational state of the first tag element to be changed (e.g., cause transitioning the first tag element between a power save mode and non-power save mode). In some scenarios, the operational state change can be achieved by changing the binary value of at least one state bit (e.g., from 0 to 1, or vice versa) for causing certain communication control operations to be performed by the tag 200. Additionally or alternatively, a switch can be actuated for creating a closed or open circuit. The pre-sent solution is not limited in this regard.

Figure 3:
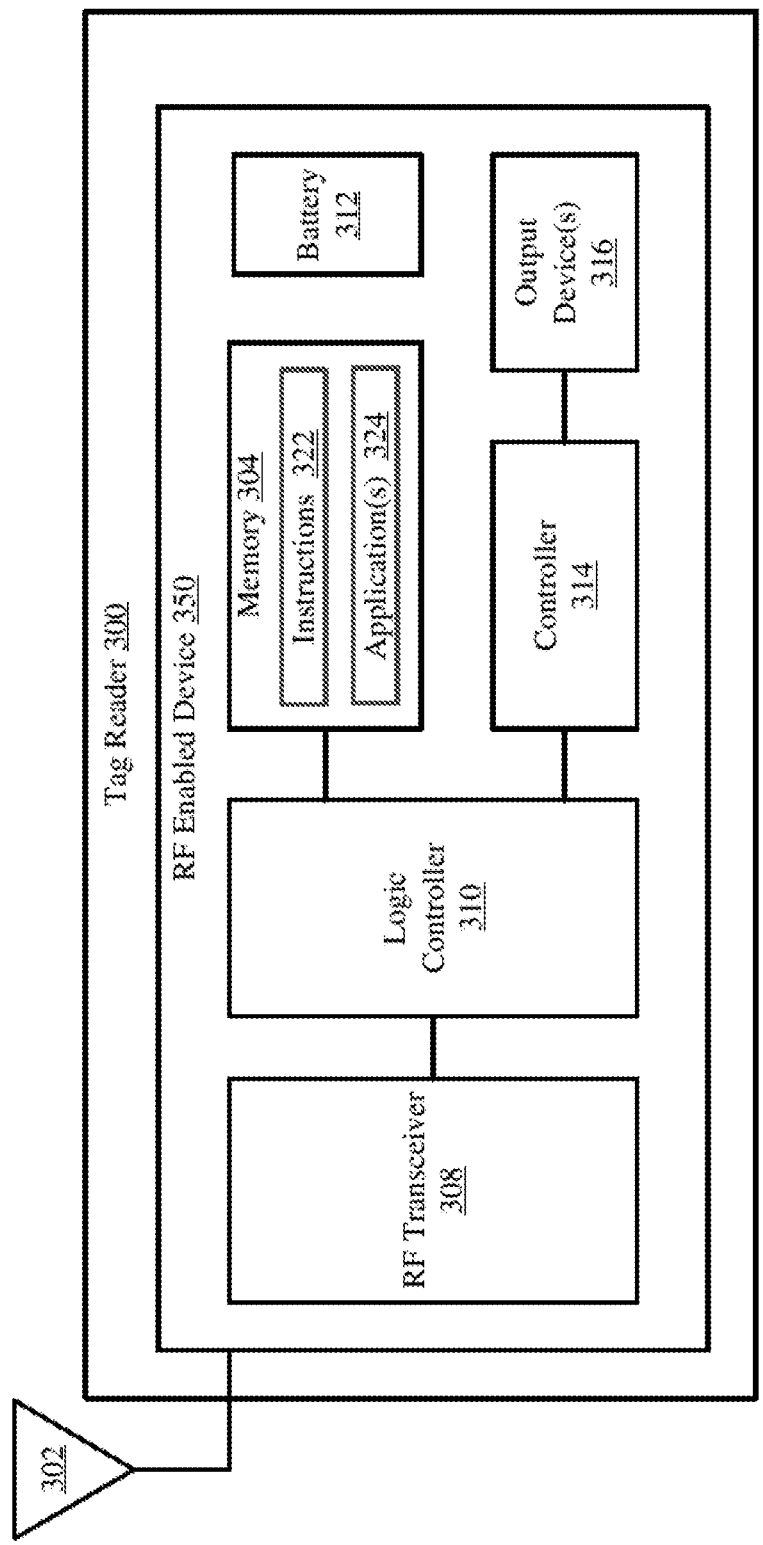
FIG. 3 is an illustration of an illustrative architecture for a tag reader.

Referring now to FIG. 3, there is provided a detailed block diagram of an exemplary architecture for a tag reader 300. Tag reader 120 of FIG. 1 is the same as or similar to tag reader 300. As such, the discussion of tag reader 300 is sufficient for understanding tag reader 120.

Tag reader 300 may include more or less components than that shown in FIG. 3. However, the components shown are sufficient to disclose an illustrative embodiment implementing the present solution. Some or all of the components of the tag reader 300 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an illustration of a representative tag reader 300 configured to facilitate improved inventory counts and management within an RSF (e.g., RSF 128 of FIG. 1). In this regard, the tag reader 300 comprises an RF enabled device 350 for allowing data to be exchanged with an external device (e.g., RFID tags 112$_1$-112$_N$, 118$_1$-118$_X$ of FIG. 1) via RF technology. The components 304-316 shown in FIG. 3 may be collectively referred to herein as the RF enabled device 350, and may include a power source 312 (e.g., a battery) or be connected to an external power source (e.g., an AC mains).

The RF enabled device 350 comprises one or more antennas 302 for allowing data to be exchanged with the external device via RF technology (e.g., RFID technology or other RF based technology). The external device may comprise RFID tags 112$_1$-112$_N$, 118$_1$-118$_X$ of FIG. 1. In this case, the antenna 302 is configured to transmit RF carrier signals (e.g., interrogation signals) to the listed external devices, and/or transmit data response signals (e.g., authentication reply signals or an RFID response signal) generated by the RF enabled device 350. In this regard, the RF enabled device 350 comprises an RF transceiver 308. RF transceivers are well known in the art, and therefore will not be described herein. However, it should be understood that the RF transceiver 308 receives RF signals including information from the transmitting device, and forwards the same to a logic controller 310 for extracting the information therefrom.

The extracted information can be used to determine the presence, location, and/or type of movement of an RFID tag within a facility (e.g., RSF 128 of FIG. 1). Accordingly, the logic controller 310 can store the extracted information in memory 304, and execute algorithms using the extracted information. For example, the logic controller 310 can correlate tag reads with beacon reads to determine the location of the RFID tags within the facility. The logic controller 310 can also perform pattern recognition operations using sensor data received from RFID tags and comparison operations between recognized patterns and pre-stored patterns. The logic controller 310 can further select a time slot from a plurality of time slots based on a tag's unique identifier (e.g., an EPC), and communicate information specifying the selected time slot to the respective RFID tag. The logic controller 310 may additionally determine a WOT during which a given RFID tag's communication device (e.g., transceiver) or operation(s) is(are) to be turned on when motion is detected thereby, and communicate the same to the given RFID tag. The WOT can be determined based on environmental conditions (e.g., temperature, time of day, etc.) and/or system conditions (e.g., amount of traffic, interference occurrences, etc.). Other operations performed by the logic controller 310 will be apparent from the following discussion.

Notably, memory 304 may be a volatile memory and/or a non-volatile memory. For example, the memory 304 can include, but is not limited to, a RAM, a DRAM, an SRAM, a ROM, and a flash memory. The memory 304 may also comprise unsecure memory and/or secure memory. The phrase "unsecure memory," as used herein, refers to memory configured to store data in a plain text form. The phrase "secure memory," as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate determinations as to whether or not RFID tags are present within a facility, where the RFID tags are located within a facility, which RFID tags are in motion at any given time. Other functions of the RF enabled device 350 will become apparent as the discussion progresses.

Figure 4:
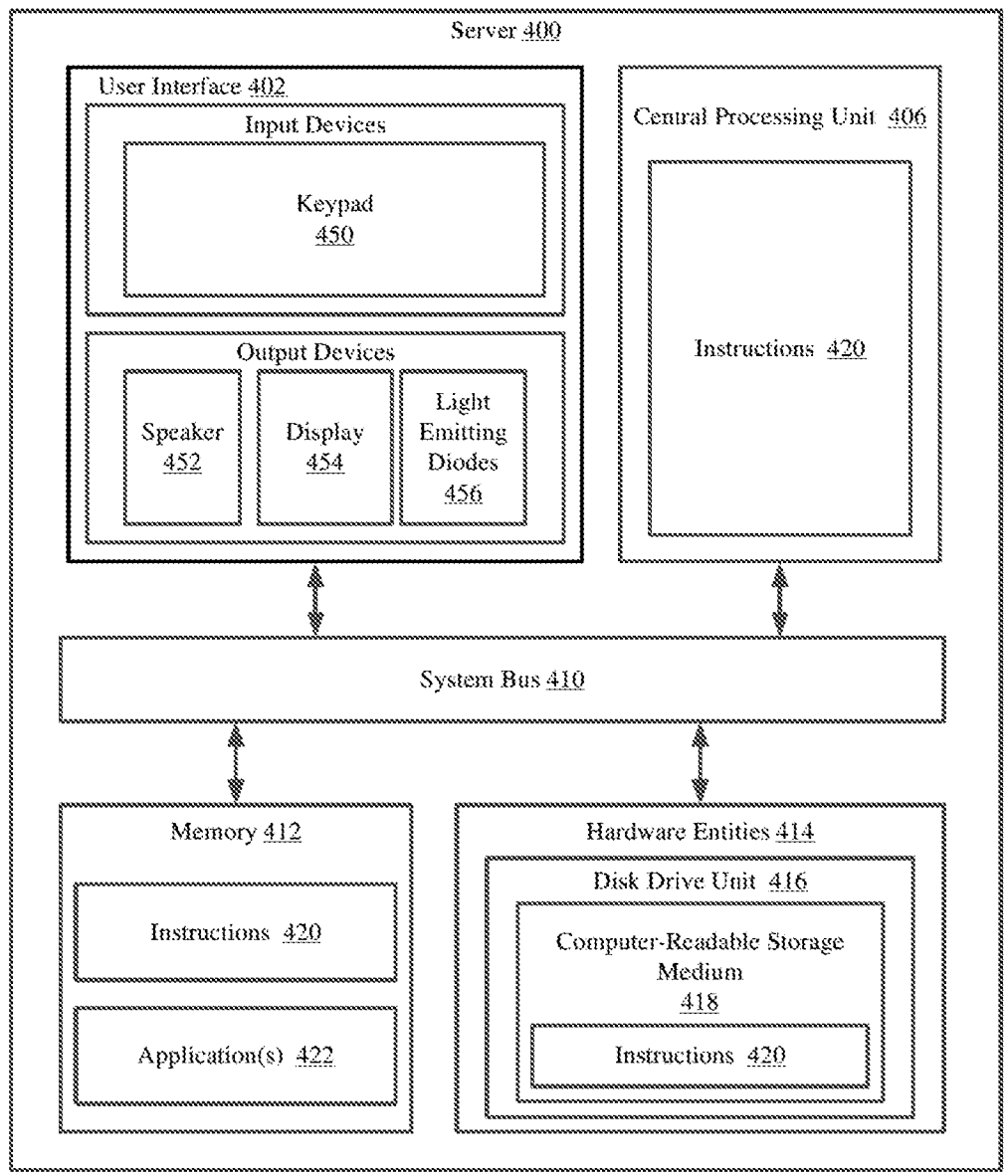
FIG. 4 is an illustration of an illustrative architecture for a server.

Referring now to FIG. 4, there is provided a detailed block diagram of an exemplary architecture for a server 400. Server 124 of FIG. 1 is the same as or substantially similar to server 400. As such, the following discussion of server 400 is sufficient for understanding server 124.

Notably, the server 400 may include more or less components than those shown in FIG. 4. However, the components shown are sufficient to disclose an illustrative embodiment implementing the present solution. The hardware architecture of FIG. 4 represents one embodiment of a representative server configured to facilitate inventory counts, inventory management, and improved customer experiences.

Some or all the components of the server 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to, and/or programmed to perform one or more of the methodologies, procedures, or functions described herein.

As shown in FIG. 4, the server 400 comprises a user interface 402, a CPU 406, a system bus 410, a memory 412 connected to and accessible by other portions of server 400 through system bus 410, and hardware entities 414 connected to system bus 410. The user interface can include input devices (e.g., a keypad 450) and output devices (e.g., speaker 452, a display 454, and/or light emitting diodes 456), which facilitate user-software interactions for controlling operations of the server 400.

At least some of the hardware entities 414 perform actions involving access to and use of memory 412, which can be a RAM, a disk driver, and/or a Compact Disc Read Only Memory ("CD-ROM"). Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, with-in the memory 412 and/or within the CPU 406 during execution thereof by the server 400. The memory 412 and the CPU 406 also can constitute machine-readable media. The term "machine-readable media," as used here, refers to a single medium or multiple media (e.g., a centralized or distributed database, and/or associated caches and servers) that store the one or more sets of instructions 420. The term "machine-readable media," as used here, also refers to any medium that is capable of storing, encoding, or carrying a set of instructions 420 for execution by the server 400 and that cause the server 400 to perform any one or more of the methodologies of the present disclosure.

In some scenarios, the hardware entities 414 include an electronic circuit (e.g., a processor) programmed for facilitating the provision of a three-dimensional map showing locations of RFID tags within a facility and/or changes to said locations in near real-time. In this regard, it should be understood that the electronic circuit can access and run a software application 422 installed on the server 400. The software application 422 is generally operative to facilitate: the determination of RFID tag locations within a facility; the direction of travel of RFID tags in motion; and the mapping of the RFID tag locations and movements in a virtual three-dimensional space.

In those or other scenarios, the hardware entities 414 include an electronic circuit (e.g., a processor) programmed for facilitating item inventorying, merchandise sale, and/or customer satisfaction with a shopping experience. In this regard, the electronic circuit can access and run an inventorying software application 422 and an MCD display software application 422 installed on the server 400. The software applications 422 are collectively generally operative to: obtain item level information and/or other information from MCDs and RFID tags; program item level information, accessory information, related product information and/or discount information onto RFID tags and/or MCDs; convert the language, pricing and/or currency symbol of item level information, accessory information, related product information and/or discount information; facilitate registration of RFID tags and MCDs with an enterprise system; and/or determine when MCD display update actions need to be taken based on RFID tag information. Other functions of the software applications 422 will become apparent as the discussion progresses. Such other functions can relate to tag reader control and/or tag control.

Figure 5:
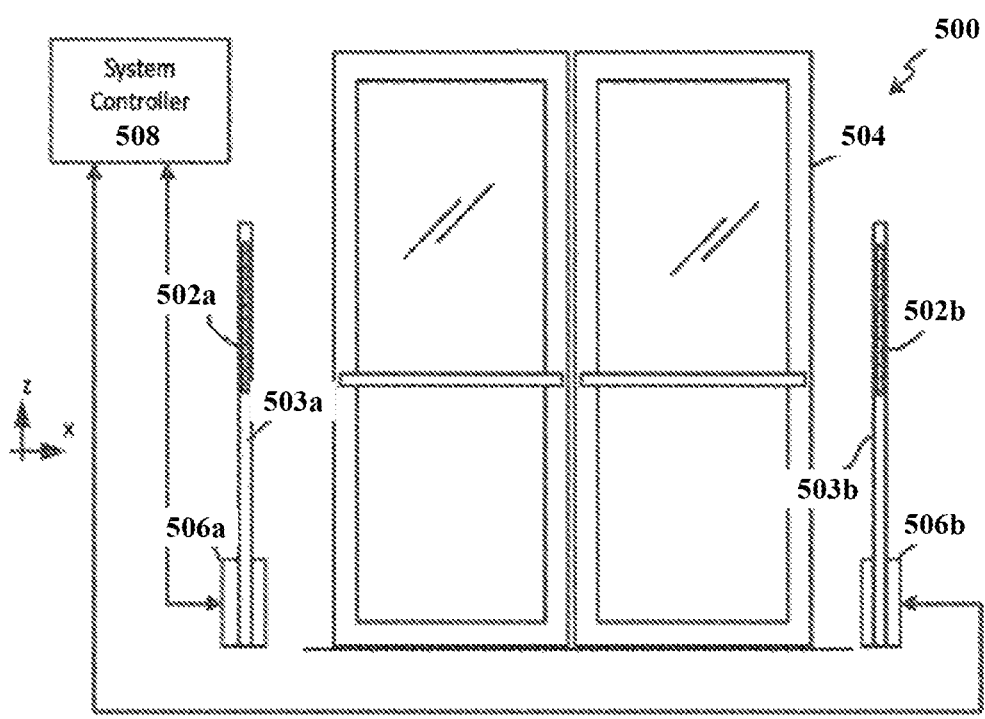
FIG. 5 is a plan view of an RFID portal system at a choke point.
Figure 6:
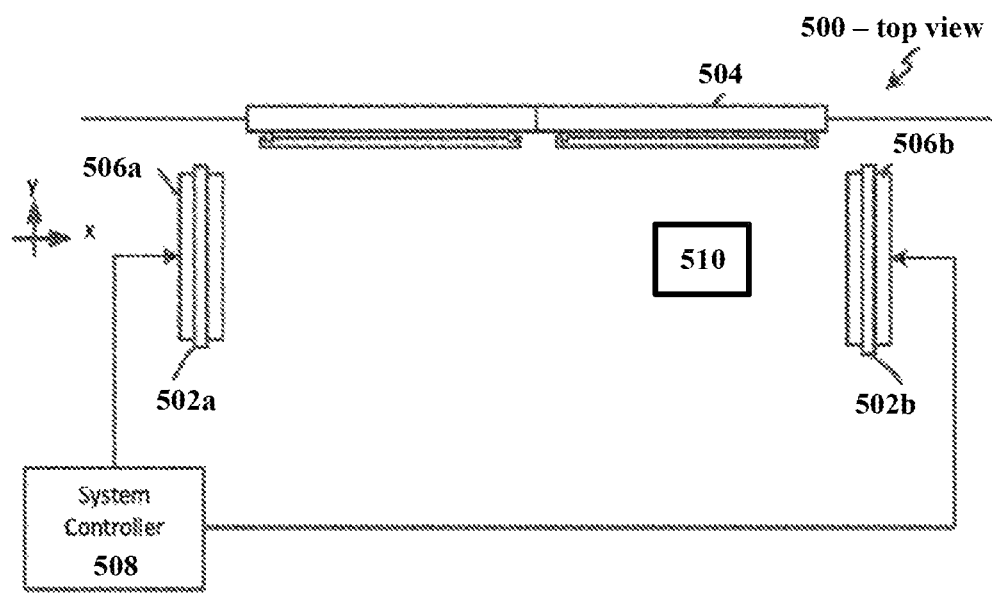
FIG. 6 is a top view of the RFID portal system in FIG. 5.
Figure 7:
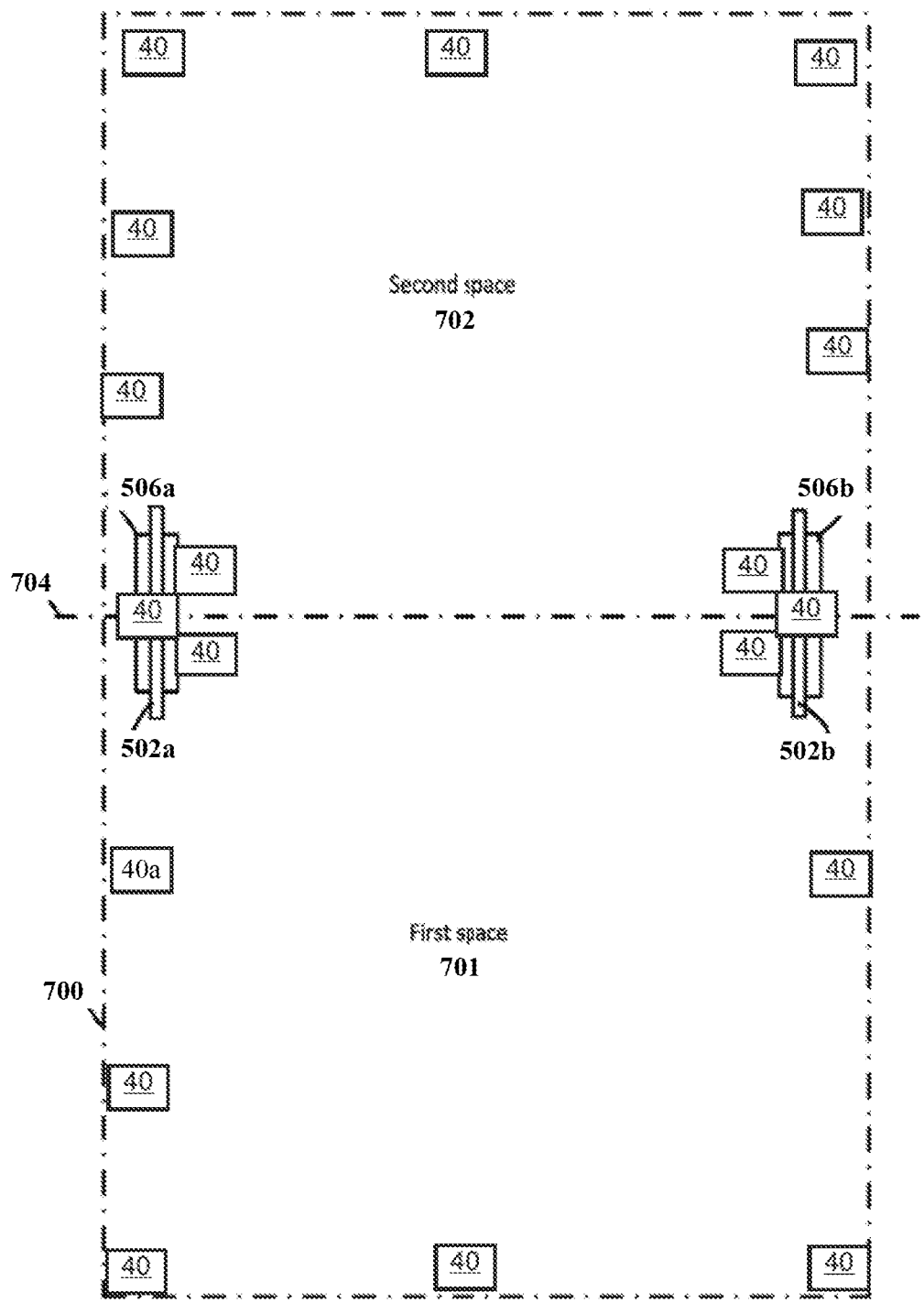
FIG. 7 is an example of portal zones surrounding an RFID portal system.

In FIGS. 5-7 there is shown an RFID portal 500 (plan view in FIG. 5, top view in FIG. 6), which is useful for understanding certain aspects of the technology disclosed herein. The RFID portal 500 includes two RFID readers 506a, 506b (such as tag reader 300); each of them are respectively attached to antennas 502a, 502b (such as antenna 302) mounted on sides of the portal 500. An RFID reader 506 as referenced herein is capable of generating RFID tag exciter signals to control and elicit responses from one or more of a plurality of RFID tags 510 (such as tag 200) in a RFID portal zone. The RFID exciter signals can also serve as a source of power for energizing the RFID tags 510. The exciter signals generated by the RFID readers 506a, 506b and responses received by each reader 506a, 506b will be in accordance with an RFID system standard that is now known or known in the future. The RFID readers 506a, 506b also can detect, identify and/or process one or more of the responses from the plurality of RFID tags 510 in a portal zone. The RFID readers 506a, 506b include suitable interface circuitry to facilitate communications with a system controller 508 as described below. For example, the interface circuitry can facilitate communication of information regarding detected responses received from RFID tags 510. Such interface circuitry can also facilitate reception of interrogation commands and/or antenna beam control commands from the system controller 508.

In the portal 500 shown, the antennas 502a, 502b are mounted on pedestals 503a, 503b, but the technology disclosed herein is not limited in this regard. Antennas 502 can be mounted in the ceiling or in the ground, and the method described herein would still be applicable. There is no restriction regarding the type of antennas 502 that are used to produce the required field patterns. However, in this example portal 500, antennas 502a, 502b are understood to be beam steerable so that multiple different antenna beam directions can be obtained from a single antenna 502a, 502b. Control over the required antenna field patterns can be facilitated by the RFID readers 506a, 506b as noted above. In addition, two antennas 502a and 502b are shown in FIG. 5, but it should be understood that the technology disclosed herein is not limited in this regard. The inventive arrangements descried herein could be implemented using a single beam steerable antenna.

The RFID portal 500 can be placed in the vicinity of an exit point in a facility where goods and items must pass through in order to transition from one space inside the facility to a second space, which is outside of the facility. In the example shown in FIG. 5 and FIG. 6, the exit point is a doorway 504, but the technology disclosed herein is not limited in this regard. The exit/choke point can also be a wide exit such as those seen in shopping malls, which is open to another interior space, which is not a part of the facility. The RFID readers 506a, 506 can be operated under the command of a system controller 508, such as server 124, which facilitates the detection of one or more RFID tags 510 within a field of view of each antenna as hereinafter described.

As shown in FIG. 7, the RFID portal 500 will define a boundary 704 (similar to exit point 504) that separates a portal zone 700 into a first interior space 701, which may be located inside a facility such as a retail store, and a second exterior space 702, which is considered to be outside the retail store. The portal zone 700 generally defines the area in which the RFID portal 500 is capable of detecting and reading RFID tags 510. The portal zone 700 is shown as a regular rectangular shape in FIG. 7 for ease of illustration, but it should be understood that the actual shape of the portal zone 700 can be somewhat irregular, as it will depend on the portal reader 506a, 506b, antenna system 502a, 502b and environmental factors which defines the field of view of the system. The first space 701 and the second space 702 are respectively physical spaces or areas of the portal zone 700 defined on opposing sides of the boundary 704 as shown. The RFID portal 500 will (1) inventory all tags 510 crossing the portal boundary 704 between the first and second space, (2) provide enough reads per crossing tag 510 to determine directionality of such movement, (3) inventory all static tags 510 in the portal zone 700 surrounding the portal 500.

In addition, as shown in FIG. 7 examples of technology disclosed herein include one or more additional sensors 40 installed in and near the portal 500. Data collected by the one or more additional sensors 40 is transmitted to the RFID portal 500 or other central enterprise system. The one or more additional sensors 40 can include sensors of various types, as described herein. The number of sensors 40 shown in FIG. 7, as well as their positon indicated in FIG. 7, is for illustrative purposes only. In practice, the sensors 40 can be installed in any desired position, and in any desired arrangement and combination, that yields desirable results. The number of sensors 40 can be as few as one sensor, or as many as are required for efficient operation.

In one aspect of the technology disclosed herein, one or more types of motion sensors 40 are to detect human traffic moving through the portal zone 700 towards the boundary 704. According to such aspects, if the RFID reader 502a, 502b senses a potential alarm event based on data from an RFID tag 510 read and raises an Alarm Event Flag. If, within a predetermine interval of time following the setting of the Alarm Event Flag, the motion sensor(s) indicate no motion present, then potential alarm events can either be suppressed entirely by removing the Alarm Event Flag. This serves to suppress possible false alarms due to reflections when people are not present immediately near the boundary 704. The detection of motion, which may be indicative of a human exiting the store carrying a detected, unauthorized tag, is thus used to validate the alarm event flag.

In some examples, after an initial tag read causes an Alarm Event Flag to be raised, the technology disclosed herein can further condition the Alarm Event Flag on additional or alternate requirements. The additional or alternative requirements can be based on environmental data or supplemental tag sensing/reading data. If all requirements for the Alarm Event Flag status are met, a human-perceptible alarm can be triggered. In accordance with the principles of the technology disclosed herein, any suitable type of motion sensor can be used in the inventive system, and multiple types of motion sensors can be used in combination.

In some examples, an array of passive infrared (PIR) sensors 40 can be used which detect human traffic, travel direction, and speed of travel (e.g. walking speed). The PIR sensors 40 can be mounted at various locations to sense traffic moving through and near the boundary 704. The IR sensors 40 can be mounted to the exit pedestals 503 and other structures that are in the proximity of the boundary 704. In some examples, two or more active IR sensors 40 can be used to detect objects (both human and inanimate) moving through the portal zone 700, along with the speed and direction of travel, based on beam-break patterns. In some examples, one or more ultrasonic motion sensor 40a can be used to detect motion, direction, and speed of objects moving through the portal zone 700. Other suitable sensors 40 for detecting motion, direction, and speed of objects in or near the boundary 704 can include, but are not limited to, microwave sensors, tomographic motion detectors, and software-implemented video detection. Combinations of the above-described sensors 40 also can be deployed as part of the technology disclosed herein.

In some examples, the technology disclosed herein detects both animate (humans, possibly animals) and inanimate objects that move through the portal zone 700, and also can distinguish between animate and inanimate objects. This enables such examples to detect motion caused by merchandise thrown or otherwise propelled through boundary 704. In some examples, the technology triggers an alarm if the system detects merchandise moving through the portal 500 even if no humans are detected walking through. For example, thieves might try to confuse the detection system by forcefully shoving an unguided shopping cart across the boundary 704 to a waiting accomplice.

The additional sensors 40 can include one or more additional, supplemental RFID tag readers 300, which can be positioned to detect the tag 200 again at position(s) near the point of exit. The one or more additional RFID readers 300 can be fixedly installed to read tags 200 at the point of exit, and can be mounted, for example, on the ceiling. In this way, the Alarm Event Flag raised by an initial tag read can be validated by a second tag read downstream of the first, primary tag read. If an unauthorized (unassociated with an unpurchased item, or unassociated with a purchased item) tag 200 is detected by the primary readers 300/506, but no tag is detected moving towards the boundary 704, the Alarm Event Flag is removed. If the Alarm Event Flag is validated by a second tag read at the boundary 704, the actual alarm can be triggered. The alarm can be an audible alarm, or the alarm can be generated in some other form, such as an alert transmitted to a various monitoring systems. In some embodiments, the alarm can include alerts transmitted to communications devices monitored by store personnel (such as a text message sent to a mobile phone).

In some example, additional sensors 40 for detecting tags can include other Short Range Communication ("SRC") technologies, such as Bluetooth and Bluetooth Low Energy (BLE) technology. In some examples, the additional sensors 40 can include one or more Bluetooth beacons that can be fixedly mounted at the boundary 704. In such examples, the tags 200 can include a Bluetooth chip, an energy harvesting circuit, and an internal power storage element. After an Alarm Event Flag is raised by an initial tag read, the Alarm Event Flag can be validated by a Bluetooth beacon receiving a response from the Bluetooth-enabled tag. The position of the tag 200 can be estimated by its proximity to the known, fixed position of the Bluetooth beacon. If the Alarm Event Flag for the tag 200 is not validated by second detection by the Bluetooth beacon, the Alarm Event Flag may be removed. Since the Bluetooth chip is actively powered in the tag 200 of embodiment, the Bluetooth beacon can transmit at a much lower power level, reducing the possibility of reflected signals that may cause false positives.

In examples employing motion sensors as sensor 40, the sensors 40 can determine the approximate speed at which the unauthorized tag 200 is moving through the portal zone 700. Such examples also can determine the tag speed by detecting a human who may be transporting the unauthorized tag 200 through the portal zone 700, and estimating the walking speed of the person. The derived speed data is used to estimate the time when the detected unauthorized tag 200 should arrive at a predetermined position that is monitored by at least one sensor 40. Examples of the technology then validate/invalidate the Alarm Event Flag based on whether a tag 200, human, or object arrives at the predetermined position to be read by the sensor 40 within the expected interval of time based on the rate of travel.

In some examples, the technology disclosed herein includes machine learning/an adaptive algorithm that processes input from RFID tag reads and sensor 40 data to train/adapt. In this way, when RFID tag reads result the raising of an Alarm Event Flag that are not validated by the additional sensors 40, and thus determined to be false alarms, the technology can automatically detect and store real-time signal data relevant to the tag read that caused the potential false alarm. Thus, the adaptive algorithm could, over time, in varying store environments, learn what reflection patterns cause false alarms and automatically discount them. It is further contemplated that one or more additional sensors 40 could be installed as temporary "training" sensors. The "training" sensors would be in use only temporarily to allow the technology to collect data to learn the specific store environment, and then removed. (This makes sense if a semi-standardized machine learning system is being trained for a specific store environment).

Figure 8:
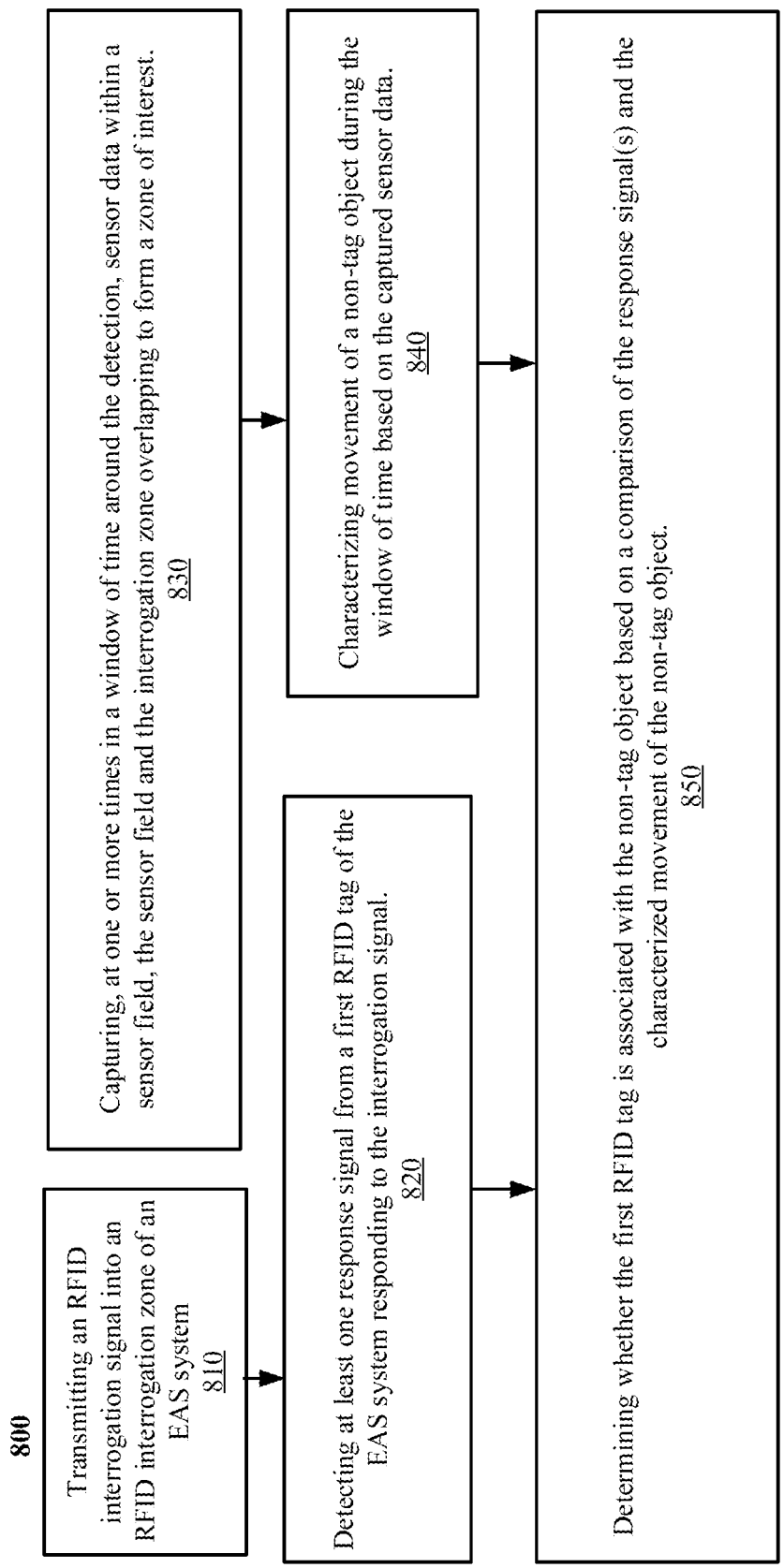
FIG. 8 is a flow chart flow chart of a method of electronic article surveillance, in accordance with examples of the technology disclosed herein.

Referring to FIG. 8, and continuing to refer to prior figures for context, methods 800 for electronic article surveillance (EAS) are shown. In such methods 800, an EAS system transmits a radio frequency identification (RFID) interrogation signal into an RFID interrogation zone of an EAS system—Block 810. In a continuing example, readers 502a, 502b transmit an interrogation signal to cover the first space 701, an interior space of facility 128 over a period of time T.

Figure 11:
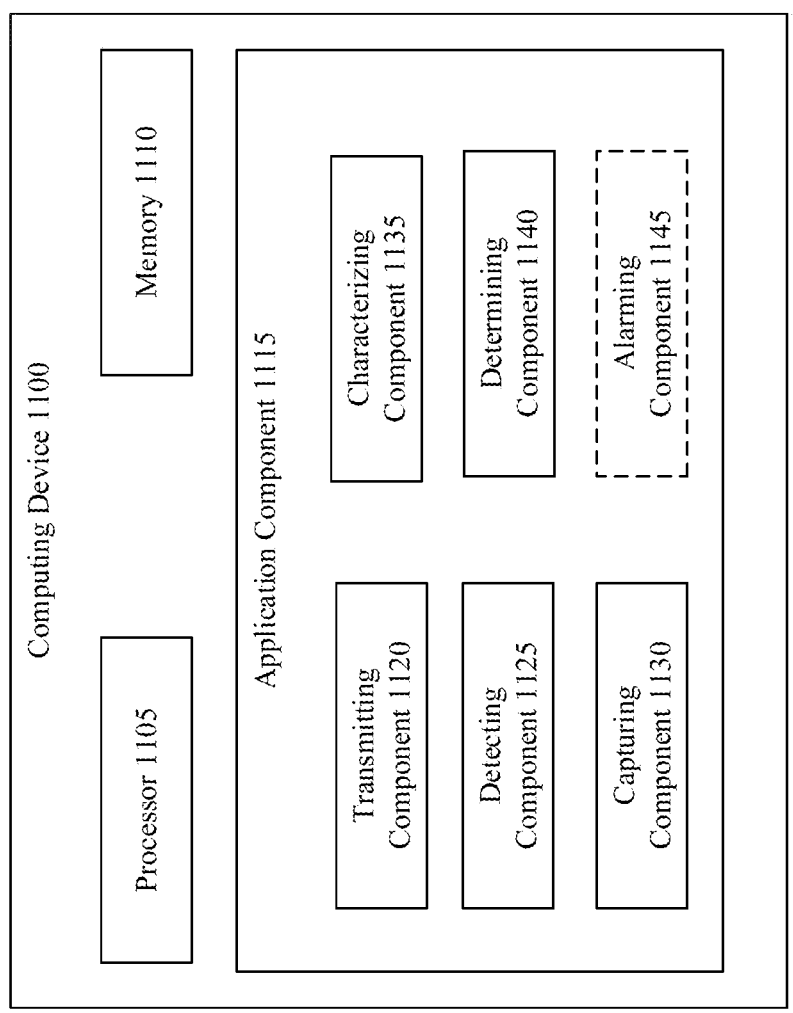
FIG. 11 is an illustration of a computing device including components for performing the function of examples of the technology disclosed herein.

Referring to FIG. 11, in operation, RFID system 500 may perform a method 800 of electronic article surveillance, by such as via execution of application component 1115 by processor 1105 and/or memory 1110—wherein application component 1115, processor 1105, and/or memory 1110 are components of computing device 1100. Computing device 1100 can be one or more of tag 510 or tag 200, tag reader 506 or tag reader 300, and system controller 508 or server 400—as appropriate as explained elsewhere herein. In a separate example, application component 1115 includes transmitting component 1120 that is configured to or may comprise means for transmitting an RFID interrogation signal into an RFID interrogation zone of an EAS system.

The EAS system detects at least one response signal from a first RFID tag of the EAS system responding to the interrogation signal—Block 820. In the continuing example, one or both readers 506a, 506b detect, via multiple reads over time period $T_1$-$T_2$, tag 510 that is in first space 701, but away from boundary 704. Each read is characterized by a received signal strength indicator (RSSI) from tag 510 and implies a tag position. In the separate example, application component 1115 includes detecting component 1125 comprising means for detecting at least one response signal from a first RFID tag of the EAS system responding to the interrogation signal.

The system captures, atone or more times in a window of time around the detection, sensor data within a sensor field, the sensor field and the RFID interrogation zone overlapping to form a zone of interest—Block 830. In the continuing example, ultrasonic motion sensor 40a, in communication with controller 508, captures sensor data regarding a non-tag object in its sensor field in first space 701. In the separate example, application component 1115 includes capturing component 1130 comprising means for capturing, at one or more times in a window of time around the detection, sensor data within a sensor field, the sensor field and the RFID interrogation zone overlapping to form a zone of interest.

The system characterizes movement of a non-tag object during the window of time based on the captured sensor data—Block 840. In the continuing example, the system uses the captured sensor data to characterize the non-tag object as at position X moving at speed S in the direction of boundary 704. In the separate example, application component 1115 includes characterizing component 1135 comprising means for characterizing movement of a non-tag object during the window of time based on the captured sensor data.

The system then determines whether the first RFID tag is associated with the characterized non-tag object based on a comparison of the at least one response signal and the characterized movement of the non-tag object—Block 850. In the continuing example, system controller 508 determines that from position X moving at speed Sin the direction of boundary 704, the non-tag object should be at position Y close to the boundary (in the zone of interest) at time $T_{2est}$. The system controller correlates the RSSI-implied RFID read position estimates detected during Block 810 with ultrasonic motion sensor data at time $T_{2est}$ and concludes that both the tag 510 and the detected non-tag object were in the zone of interest. In the separate example, application component 1115 includes determining component 1140 comprising means for determining whether the first RFID tag is associated with the characterized non-tag object based on a comparison of the at least one response signal and the characterized movement of the non-tag object.

Figure 9:
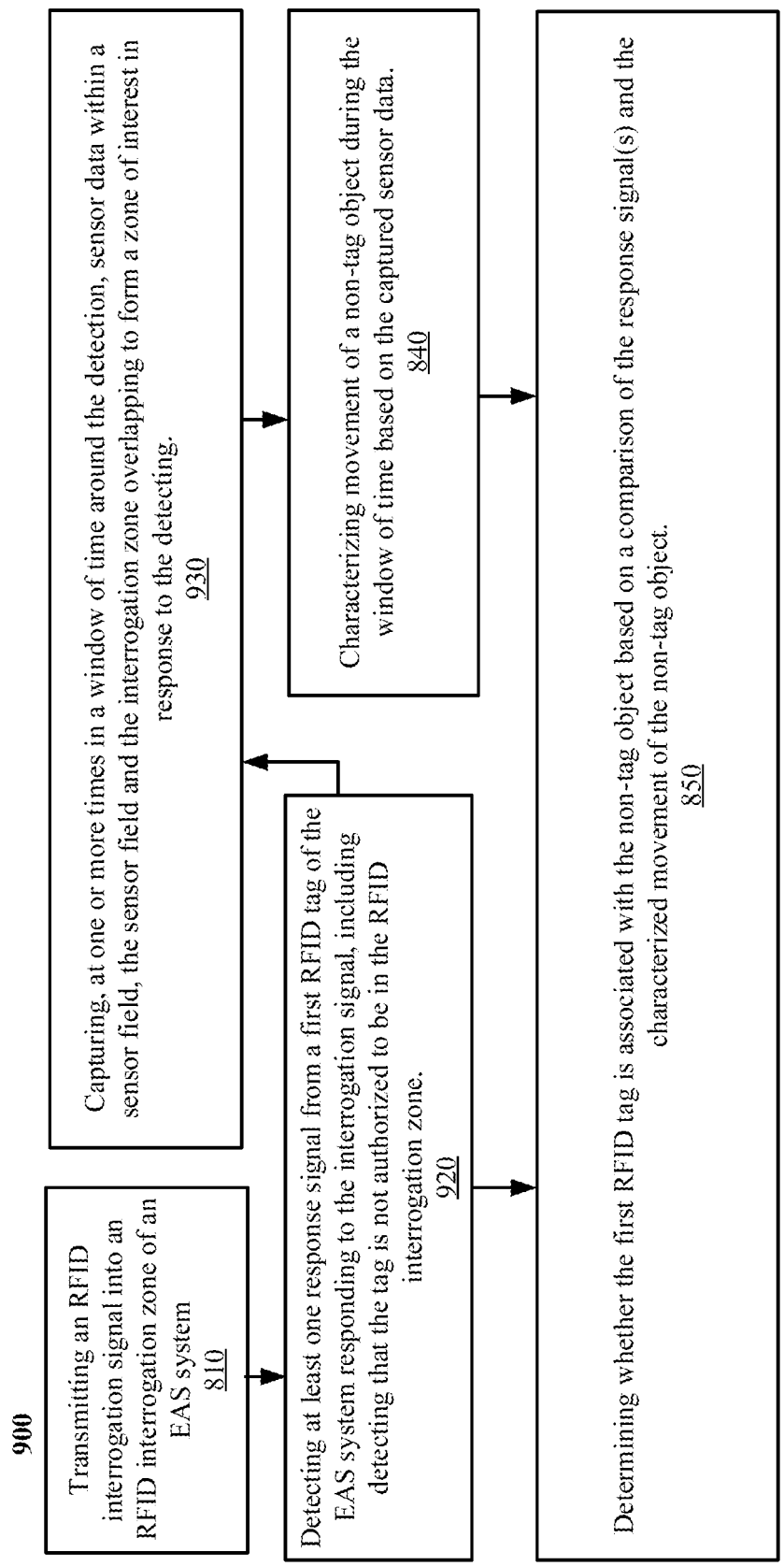
FIG. 9 is a flow chart of a method of electronic article surveillance, in accordance with examples of the technology disclosed herein.

Referring to FIG. 9, and continuing to refer to prior figures for context, methods 900 for electronic article surveillance (EAS) are shown. In such methods 900, Blocks 810, 840, and 850 are performed as described above in conjunction with FIG. 8. In such methods 900, detecting includes detecting that the tag is not authorized to be in the RFID interrogation zone (Block 920), and capturing is in response to the detecting (Block 930). In a continuing example, readers 502a, 502b transmit an interrogation signal to cover the first space 701, an interior space of facility 128 over a period of time T.

Figure 10:
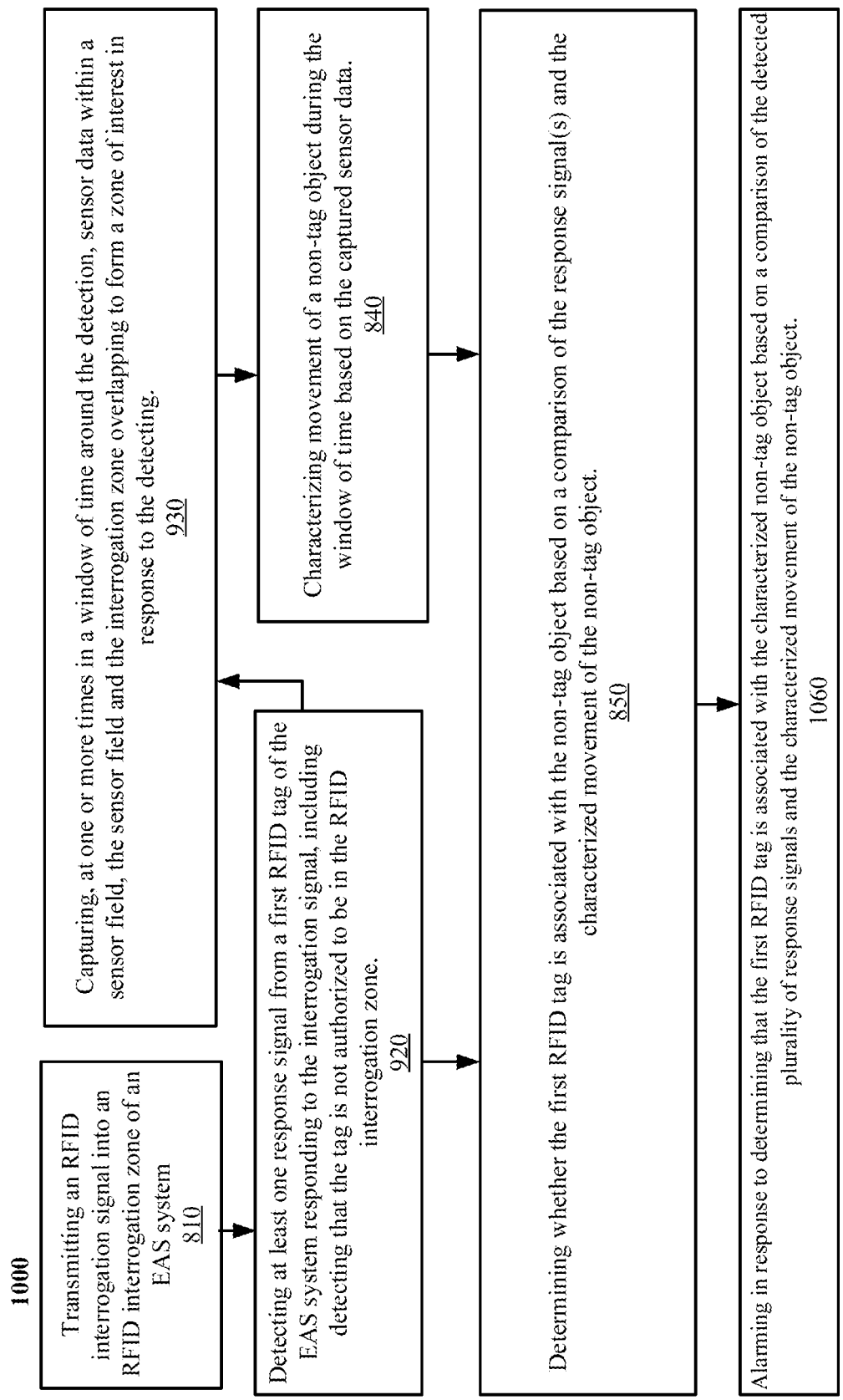
FIG. 10 is a flow chart of a method of electronic article surveillance, in accordance with examples of the technology disclosed herein.

Referring to FIG. 10, and continuing to refer to prior figures for context, methods 1000 for electronic article surveillance (EAS) are shown. In such methods 1000, Blocks 810, 920, 930, 840, and 850 are performed as described above in conjunction with FIG. 8. In such methods 1000, after determining that the first RFID tag is both not authorized (Block 920) and associated with the characterized non-tag object based on a comparison of the detected plurality of response signals and the characterized movement of the non-tag object (Block 850), the EAS system alarms—Block 1060. In the continuing example, the EAS system 500 alerts security personnel stationed at boundary 704 over an MCD 130 of the security personnel. In the separate example, application component 1115 includes alarming component 1145 comprising means for alarming in response to determining that the first RFID tag is associated with the characterized non-tag object based on a comparison of the detected plurality of response signals and the characterized movement of the non-tag object.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of electronic article surveillance (EAS), comprising:
    transmitting a radio frequency identification (RFID) interrogation signal into an RFID interrogation zone of an EAS system;
    detecting at least one response signal from a first RFID tag of the EAS system responding to the interrogation signal;
    capturing, at one or more times in a window of time around the detection, sensor data within a sensor field, the sensor field and the RFID interrogation zone overlapping to form a zone of interest;
    characterizing movement of a non-tag object during the window of time based on the captured sensor data; and
    determining whether the first RFID tag is associated with the characterized non-tag object based on a comparison of the at least one response signal and the characterized movement of the non-tag object.

2. The method of claim 1, wherein the capturing is in response to the detecting.

3. The method of claim 2, wherein the detecting further comprises detecting that the tag is not authorized to be in the RFID interrogation zone.

4. The method of claim 3, further comprising, alarming in response to determining that the first RFID tag is associated with the characterized non-tag object based on a comparison of the detected at least one response signal and the characterized movement of the non-tag object.

5. The method of claim 1, wherein characterizing comprises estimating one or more of a speed of the non-tag object and a direction of travel of the non-tag object.

6. The method of claim 1, wherein determining whether the first RFID tag is associated with the characterized non-tag object comprises determining a similarity greater than a threshold similarity between the detected at least one response signal and the characterized movement of the non-tag object.

7. The method of claim 1, wherein the zone of interest is an RFID portal zone of the EAS system.

8. The method of claim 1, wherein:
    the interrogation zone is at an exterior boundary of a controlled area;
    capturing sensor data comprises capturing first sensor data;
    determining comprises:
        determining a direction of travel of the non-tag object based on the captured first sensor data; and
        for a determined direction of travel of the non-tag object toward the interrogation zone, estimating an arrival time of the non-tag object in the zone of interest;
    capturing sensor data further comprises capturing second sensor data in the zone of interest during a predetermined threshold window of time around the estimated arrival time; and
    determining further comprises:
        determining whether a non-tag object arrives in the zone of interest during the predetermined threshold window of time;
        for a determination that a non-tag object did not arrive in the zone of interest during the predetermined threshold window of time, not alarming on the first RFID tag; and
        for a determination that a non-tag object arrived in the zone of interest during the predetermined threshold window of time, alarming on the first RFID tag.

9. A electronic article surveillance (EAS) system, comprising:
    a radio frequency identification (RFID) tag reader operative to:
        transmit a radio frequency identification (RFID) interrogation signal into an RFID interrogation zone of an EAS system;
        detect at least one response signal from a first RFID tag of the EAS system responding to the interrogation signal;
    at least one sensor operative to capturing, at one or more times in a window of time around the detection, sensor data within a sensor field, the sensor field and the RFID interrogation zone overlapping to form a zone of interest; and
    at least one processor:
        in communication with the tag reader and the at least one sensor; and
        operative to:
            characterize movement of a non-tag object during the window of time based on the captured sensor data; and
            determine whether the first RFID tag is associated with the characterized non-tag object based on a comparison of the at least one response signal and the characterized movement of the non-tag object.

10. The system of claim 9, wherein the capturing is in response to the detecting.

11. The system of claim 10, wherein the detecting further comprises detecting that the tag is not authorized to be in the RFID interrogation zone.

12. The system of claim 11, wherein the processor is further operative to:
alarm in response to determining that the first RFID tag is associated with the characterized non-tag object based on a comparison of the detected at least one response signal and the characterized movement of the non-tag object.

13. The system of claim 9, wherein characterizing comprises estimating one or more of a speed of the non-tag object and a direction of travel of the non-tag object.

14. The system of claim 9, wherein determining whether the first RFID tag is associated with the characterized non-tag object comprises determining a similarity greater than a threshold similarity between the detected at least one response signals and the characterized movement of the non-tag object.

15. The system of claim 9, wherein the zone of interest is an RFID portal zone of the EAS system.

16. The system of claim 9, wherein:
the interrogation zone is at an exterior boundary of a controlled area;
capturing sensor data comprises capturing first sensor data;
determining comprises:
determining a direction of travel of the non-tag object based on the captured first sensor data; and
for a determined direction of travel of the non-tag object toward the interrogation zone, estimating an arrival time of the non-tag object in the zone of interest;
capturing sensor data further comprises capturing second sensor data in the zone of interest during a predetermined threshold window of time around the estimated arrival time; and
determining further comprises:
determining whether a non-tag object arrives in the zone of interest during the predetermined threshold window of time;
for a determination that a non-tag object did not arrive in the zone of interest during the predetermined threshold window of time, not alarming on the first RFID tag; and
for a determination that a non-tag object arrived in the zone of interest during the predetermined threshold window of time, alarming on the first RFID tag.

17. An apparatus for electronic article surveillance (EAS), comprising:
means for transmitting a radio frequency identification (RFID) interrogation signal into an RFID interrogation zone of an EAS system;
means for detecting at least one response signal from a first RFID tag of the EAS system responding to the interrogation signal;
means for capturing, at one or more times in a window of time around the detection, sensor data within a sensor field, the sensor field and the RFID interrogation zone overlapping to form a zone of interest;
means for characterizing movement of a non-tag object during the window of time based on the captured sensor data; and
means for determining whether the first RFID tag is associated with the characterized non-tag object based on a comparison of the at least one response signal and the characterized movement of the non-tag object.

18. The apparatus of claim 17, wherein the capturing is in response to the detecting.

19. The apparatus of claim 18, wherein the means for detecting further comprises means for detecting that the tag is not authorized to be in the RFID interrogation zone.

20. The apparatus of claim 17, wherein:
the interrogation zone is at an exterior boundary of a controlled area;
means for capturing sensor data comprises means for capturing first sensor data;
means for determining comprises:
means for determining a direction of travel of the non-tag object based on the captured first sensor data; and
means for estimating an arrival time of the non-tag object in the zone of interest for a determined direction of travel of the non-tag object toward the interrogation zone;
means for capturing sensor data further comprises means for capturing second sensor data in the zone of interest during a predetermined threshold window of time around the estimated arrival time; and
means for determining further comprises:
means for determining whether a non-tag object arrives in the zone of interest during the predetermined threshold window of time;
means for not alarming on the first RFID tag for a determination that a non-tag object did not arrive in the zone of interest during the predetermined threshold window of time; and
means for alarming on the first RFID tag for a determination that a non-tag object arrived in the zone of interest during the predetermined threshold window of time.

* * * * *